United States Patent [19]

Guy

[11] 3,727,211
[45] Apr. 10, 1973

[54] BACKSEAT OBJECT DETECTOR FOR POLICE VEHICLE

[76] Inventor: Calvin L. Guy, 9448 South 7th Avenue, Phoenix, Ariz. 85041

[22] Filed: Feb. 28, 1972

[21] Appl. No.: 229,857

[52] U.S. Cl....................................340/278, 340/280
[51] Int. Cl.............................................G08b 21/00
[58] Field of Search.......................340/278, 280, 421

[56] References Cited

UNITED STATES PATENTS 3,694,600  9/1972  Koenig................................340/278

FOREIGN PATENTS OR APPLICATIONS 751,650  7/1956  Great Britain........................340/278

*Primary Examiner*—Thomas B. Habecker
*Attorney*—William C. Cahill et al.

[57] ABSTRACT

In order to detect any attempt to discard or conceal evidentiary objects by a person being transported in the rear seat of a police vehicle, a pair of spaced apart, generally parallel resilient tubes wrapped with conductive tape in a predetermined pattern are stretched across the rear seat beneath the backrest portion thereof. The conductive foil of one of the resilient tubes is coupled to one side of the vehicle electrical system, and the conductive foil of the second resilient tube is connected to one side of an indicator lamp which has its other side, in turn, connected to the second side of the vehicle electrical system. Thus, the resilient tubes function as a switch which will cause the indicator lamp to light when the conductive portions thereof are pushed together as would be the case when an attempt is made to conceal an object by sliding it beneath the backrest. Such an attempt is thereby immediately brought to the attention of the driver or other front seat occupant of the police vehicle, and the attempt to conceal the object is correspondingly immediately associated with the specific rear seat occupant. Preferably, the indicator lamp is disposed in such a manner as to be visible only to the front seat occupants and is colored in such a manner as to attract immediate attention when it is energized. Test means in the form of a switch shunting the tubes may be incorporated for routinely checking the integrity of the system.

5 Claims, 4 Drawing Figures

BACKSEAT OBJECT DETECTOR FOR POLICE VEHICLE

This invention relates to the object detector arts, and, more particularly, to apparatus for detecting the attempted concealment of an object beneath the rear seat backrest of a police vehicle.

Certain constitutional safeguards afforded suspects of a crime and those who might be properly interrogated with respect thereto render it essential that objects which may be of evidentiary import be properly related to a specific individual. Therefore, police officers routinely search a suspect or lead to the extent deemed appropriate under the circumstances. In order to avoid compromising the position of the prosecuting entity in court proceedings, the personal search carried out must sometimes be limited in scope to such a degree that it is entirely possible for important evidentiary objects to remain concealed on a person placed in the rear sat of a police vehicle for transport from one location to another. It has been found that such persons, even when manacled, are adept at removing concealed objects from their person and sliding them beneath the backrest of the rear seat, and the evidentiary objects so discarded may not be found under conditions which satisfactorily link the object to the person who discarded it.

Police vehicles utilized to transport such persons are ordinarily provided with a divider between the front and rear seats to protect the driver of the vehicle. Thus, in many instances, it is simply impractical to visually observe all the movements of a person being transported in the rear seat, which movements might alert the officer to an attempt to conceal an object in the manner described above. Thus, it will be apparent that it would be highly desirable to provide apparatus which would immediately alert an officer in the front seat of a police vehicle to an attempt being made by a person in the rear seat thereof to conceal an object beneath the rear seat backrest.

It is therefore a broad object of my invention to provide apparatus for alerting a front seat occupant of a vehicle to an attempt by a rear seat occupant thereof to conceal an object beneath the rear seat backrest.

It is another object of my invention to provide such apparatus which is simple and reliable in operation.

It is yet another object of my invention to provide such apparatus which is inexpensive to construct and maintain and which may be readily removed from one vehicle for installation in another.

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
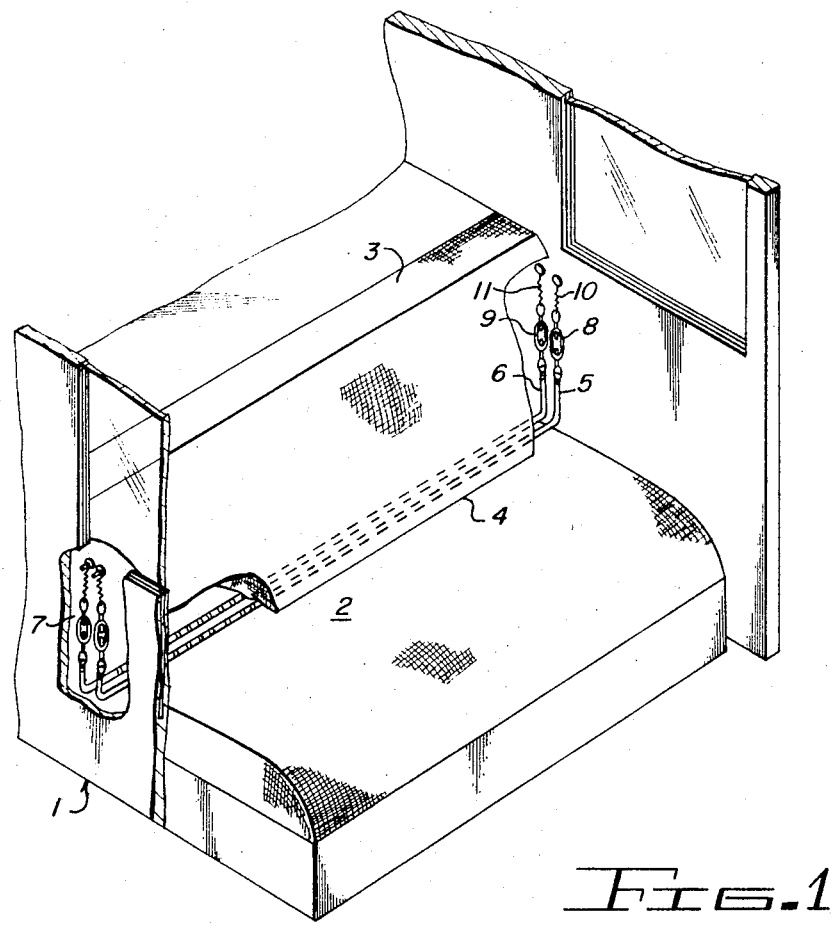
FIG. 1 is a cutaway view of the rear seat portion of a vehicle further partially cutaway to illustrate the general manner in which my apparatus may be installed in a presently preferred embodiment.

Referring now to FIG. 1, the rear seat area of a police vehicle 1 is illustrated. The seating area includes a rear seat cushion 2 and a backrest 3 which rests on top of the rearmost section of the cushion 2. Thus, the cushion 2 and the backrest 3 meet to form a resilient slot 4 into which objects may be inserted by persons in the rear seat portion of the police vehicle 1.

The sensing elements of the present invention comprise first and second resilient tubes, 5 and 6, which are positioned generally parallel to one another across the width of the rear seat cushion 2 and beneath the backrest 3. The tubes 5 and 6 are rigidly secured at first ends thereof to the framework of the vehicle 1 as indicated generally in the area 7. However, for reasons which will become apparent as the description of the invention proceeds, the second ends of each of the resilient tubes 5 and 6 are fixed to the vehicle frame by turnbuckles 8 and 9 and springs 10 and 11.

Figure 2:
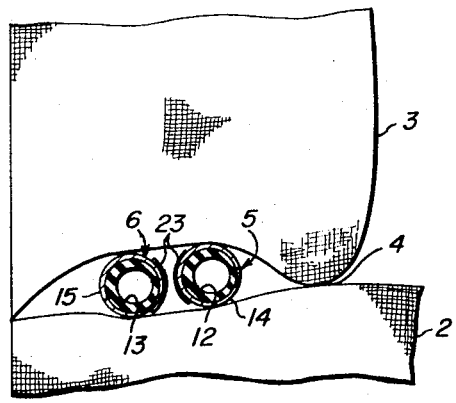
FIG. 2 is a partial cross-section taken along the lines 2—2 of FIG. 1 to illustrate the make up and position of certain elements essential to my invention.

As shown in FIG. 2, which is a typical cross-section taken along the length of the sensing apparatus, the resilient tubes 5 and 6 are normally slightly spaced apart a distance substantially uniform along their length. It will be noted, with respect to FIG. 2, that the backrest 3 rests on top the tubes 5 and 6 with sufficient combined give in conjunction with the rear seat cushion 2 as to preserve a normal appearance of the slot 4 where the two meet. Each of the resilient tubes 5 and 6 comprise a hollow rubber structure 12, 13 overlayed at intervals with circumferentially wrapped conductive foil 14 and 15. The circumferential wraps of foil on the tubes 5 and 6, respectively, are disposed directly opposite one another at intervals preferably two inches or less apart, and all the circumferential wraps on each tube are connected in parallel by a single longitudinal strip of conductive foil. Thus, if the tube 5 is pushed slightly rearwardly to touch the tube 6, a closed circuit between the two results, which closed circuit is utilized as a switch in the alarm circuit to be described.

Figure 3:
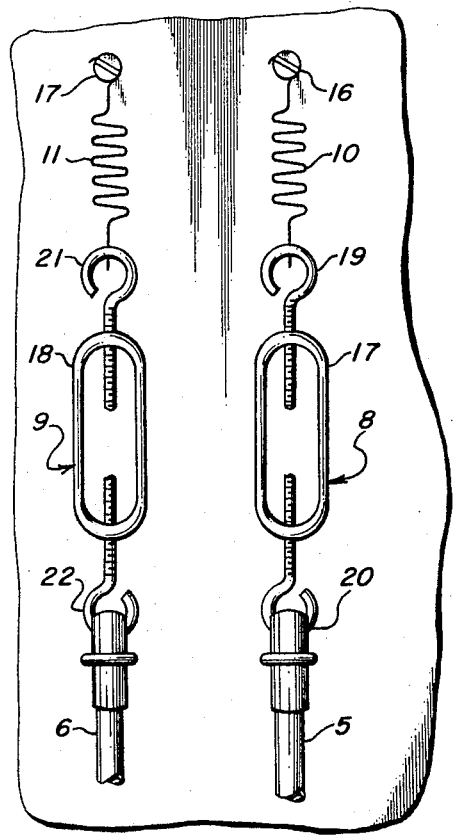
FIG. 3 is a detail view illustrating the manner in which mechanical elements of my apparatus may be fixed in a vehicle; and, FIG. 4 is a schematic representation of the electrical circuit of my invention.

It is therefore necessary that the tubes 5 and 6 be biased in their spaced apart configuration under normal conditions to avoid falsely triggering the alarm indicator. The connection means illustrated in FIGS. 1 and 3 permit ready adjustment to effect automatical assumption of the generally parallel "open circuit" condition absent some abnormal force urging or holding the tubes 5 and 6 together. As best shown in FIG. 3, the tubes 5 and 6 terminate, respectively, at one end of turnbuckles 8 and 9 which, in turn, have their other end connected to one end of springs 10 and 11. The other end of each of the springs 10 and 11 is fixed to the vehicle frame by means of bolts 16 and 17 which pass through predrilled holes in the frame. It will be noted, as previously mentioned, that the remote ends of the tubes 5 and 6 are rigidly secured to the frame such that turning the central portions 17 and 18 of the turnbuckles 8 and 9 draw the respective end portions 19, 20, 21, and 22 of the turnbuckles toward one another to stretch the springs 10 and 11, thereby setting up longitudinal tension on the tubes 5 and 6. During initial installation of the apparatus, the tension is increased in this manner until it is sufficient to hold the tubes 5 and 6 apart and in generally parallel disposition under normal conditions.

Figure 4:
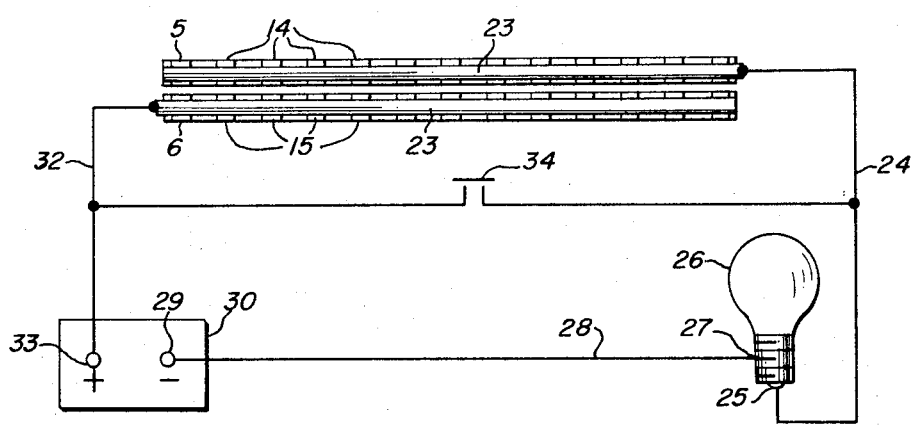

FIG. 4 illustrates more clearly the electrical interconnection of the system constituting the present invention. It will be noted that the circumferential wraps of conductive foil 14 about the resilient tube 5 are connected in parallel by means of a single longitudinal conductive strip 23 which is connected to a conductor 24. The other end of the conductor 24 is connected to a first terminal 25 of an indicator lamp 26, and the other terminal 27 of the lamp is connected by means of conductor 28 to the negative side of the vehicle electrical system as represented by the negative terminal 29 of battery 30.

Similarly, the circumferential wraps 15 of conductive foil on resilient tube 6 are connected electrically in parallel by means of longitudinal conductive strip 31 which is connected to conductor 32. The other end of the conductor 32 is connected directly to the hot side of the vehicle electrical system as represented by the positive terminal 33 of the battery 30.

In operation, when the tube 5 is moved against the tube 6 as a result of an attempt to conceal an object beneath the backrest 3 of the vehicle rear seat, one or more of the conductive strips 14 will contact corresponding conductive strips 15 on the tube 6 which completes a circuit between the negative and positive sides of the battery 30 through the indicator lamp 26. Accordingly, the indicator lamp 26, which may be brightly colored to attract immediate attention, is energized to indicate the attempt at concealment whereupon appropriate measures may be instituted by the front seat occupants of the police vehicle. The lamp 26 remains energized until the object is removed because of frictional engagement between the object and the tubes 5 and 6 which tends to hold the tubes together.

Still referring to FIG. 4, it will be apparent to those skilled in the art that the battery 30 may readily be provided completely independent from the vehicle electrical system although integration of the apparatus into the vehicle system is preferred because power source integrity may be assured. In order to periodically test the indicator lamp 26, spring loaded, normally open switch 34 is provided to shunt the resilient tubes 5 and 6 momentarily at which time the indicator lamp 26 should light. The test switch 34 is, of course, preferably disposed in a position convenient to the vehicle driver.

It will be appreciated that, while the system has been described in the environment of a police vehicle, it may be used in any vehicle or seat arrangement where a possibility of concealment, or even inadvertant loss such as in a taxi, of an object may take place.

While the principles of the invention have now been made clear in an illustrative embodiment, there will be immediately obvious to those skilled in the art many modifications of structure, arrangement, proportions, the elements, materials and components, used in the practice of the invention which are particularly adapted for specific environments and operating requirements without departing from those principles.

I claim:

1. In a vehicle with a passenger carrying area having a seat cushion and a backrest generally resting on a rear portion of said seat cushion, apparatus for detecting the placement of an object beneath said backrest comprising:
   a. a first resilient tube disposed between said seat cushion and said backrest, said first tube extending substantially across the width of said seat cushion;
   b. first attaching means for rigidly anchoring a first end of said first tube to said vehicle;
   c. first biasing means for anchoring the second end of said first tube to said vehicle such that said first biasing means applies a longitudinal pull of predetermined force to said second end of said first tube;
   d. a first conductive area disposed about at least a portion of the outer periphery of said first tube;
   e. a second resilient tube disposed between said seat cushion and said backrest, said second tube extending substantially across the width of said seat cushion, said second tube being normally disposed generally parallel and spaced apart from said first tube;
   f. second attaching means for rigidly anchoring a first end of said second tube to said vehicle;
   g. second biasing means for anchoring the second end of said second tube to said vehicle such that said second biasing means applies a longitudinal pull of predetermined force to said second end of said second tube;
   h. a second conductive area disposed about at least a portion of the outer periphery of said second tube; and
   i. a series electrical circuit comprising:
      1. said first conductive area,
      2. a first conductor,
      3. an indicator lamp,
      4. an energy source,
      5. a second conductor, and
      6. said second conductive area, whereby insertion of an object between said seat cushion and said backrest pushes said first and second tubes together, bringing said first and second conductive areas into contact to close said electrical circuit to cause said indicator lamp to light.

2. The apparatus of claim 1, in which each of said biasing means comprises a tension spring.

3. The apparatus of claim 2, in which each of said biasing means further comprises a turnbuckle structure disposed between said spring and said second end whereby said longitudinal pull may be adjusted.

4. The apparatus of claim 1, in which each of said conductive areas includes a plurality of circumferential wraps of conductive foil, the wraps of said foil about each said tube being connected in parallel, the wraps about said first tube facing corresponding wraps about said second tube.

5. The apparatus of claim 3, which further includes a normally open switch connected in said electrical circuit to momentarily close said circuit to test said circuit.

* * * * *